July 17, 1962  H. E. ALQUIST  3,044,502
LIQUID DISPENSING APPARATUS
Filed Nov. 10, 1958
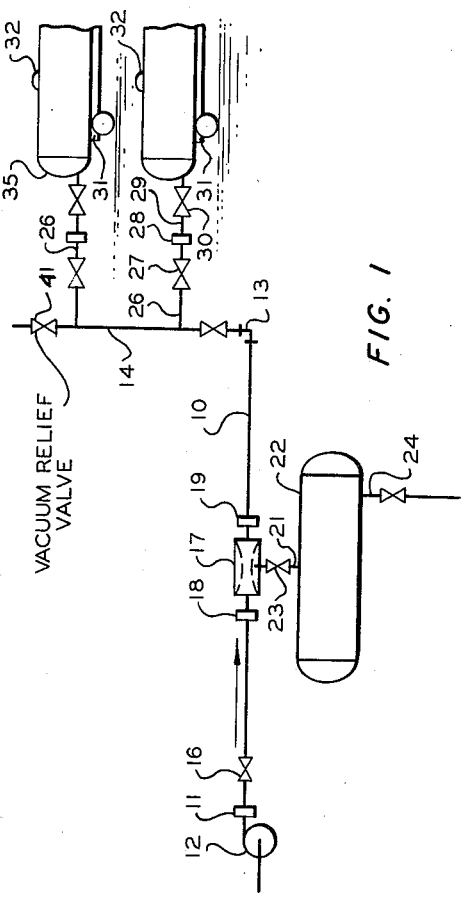
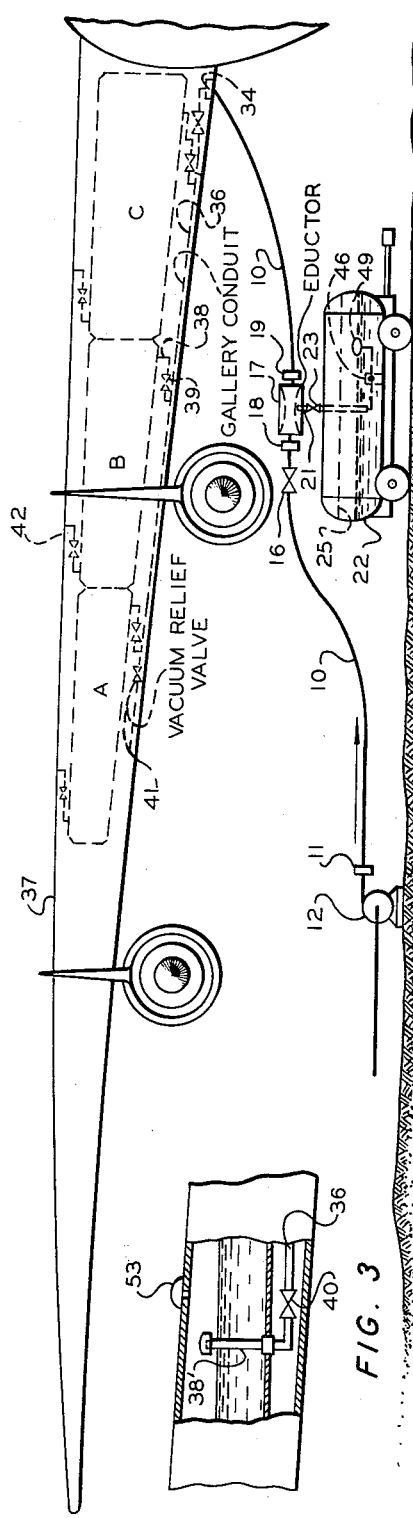
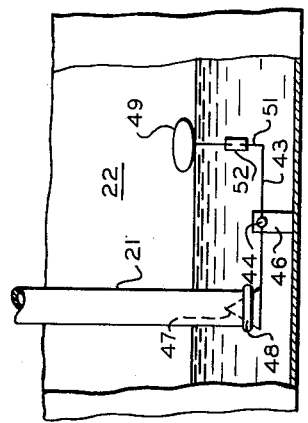
INVENTOR.
H.E. ALQUIST
BY *Hudson and Young*
ATTORNEYS United States Patent Office 3,044,502
Patented July 17, 1962

3,044,502
LIQUID DISPENSING APPARATUS
Henry E. Alquist, Bartlesville, Okla., assignor to Phillips Petroleum Company, a corporation of Delaware
Filed Nov. 10, 1958, Ser. No. 773,056
8 Claims. (Cl. 141—119)

This invention relates to liquid dispensing apparatus. In one aspect this invention relates to apparatus for emptying the liquid dispensing conduits in a liquid dispensing system when the dispensing operation is completed.

In liquid dispensing systems it is frequently desirable or necessary to empty the liquid dispensing conduits after the dispensing operation has been completed. This is often the situation at loading docks where inflammable or other hazardous liquids are being handled. For example, at loading docks dispensing gasoline or liquefied petroleum gas, it is desirable to empty said conduits for safety reasons. When the liquid being dispensed has a relatively high freezing point, such as benzene for example, it is often desirable to empty the conduits in winter time. When the loading facilities are limited, the necessity for using the same equipment for more than one product often makes it necessary to empty the dispensing conduits when the dispensing operation has been completed.

One dispensing operation wherein it has become important to empty the dispensing conduits after the dispensing operation has been completed is in the fueling of aircraft. Aircraft in the past have been equipped with fuel tanks provided with filling openings in the top of the wing. Such equipment has required no special precautions to insure emptying the aircraft fueling conduits at the conclusion of the fueling operation because gravity insures that the fuel in said conduits always flows to the tank without leaving any appreciable amount of holdup therein. Recently, however, new aircraft have been introduced which are provided with under-wing fueling systems and the problem of fuel remaining in the fueling conduits at the end of the filling operation has come to be of real importance. On those aircraft provided with an under-wing fueling system, the individual tanks are filled through a system of dispensing conduits which are usually adjacent to electrical and heating ducts. Several aircraft operators have required that such conduits (usually containing from 3 to 10 gallons of fuel) be emptied upon completion of the fueling operation. This is a difficult requirement to meet since it is not simple to reverse a pump, which normally delivers from 200 to 500 gallons per minute at 35 to 50 p.s.i., to handle such small quantities. Although some quite complex mechanical apparatus has been developed to meet this problem, no truly simple and effective apparatus has previously been available.

The present invention solves these problems by providing a simple but yet effective apparatus for emptying the fueling conduits of an aircraft provided with an under-wing fueling system after the fueling operation has been completed. The apparatus of the invention comprises an eductor disposed in the main flow conduit leading from the source of fuel, and a closed tank large enough to hold the fuel remaining in the fueling and dispensing conduits after the fueling operation has been terminated. An eduction conduit extends from the throat of said eductor and communicates with said tank. During the fueling operation, the flow of fuel through the eductor partially evacuates said tank, and at the end of the fueling operation, the evacuated tank operates to withdraw the fuel from the fueling conduits in the aircraft fueling system. As will be evident from the further description given herein, the invention is not limited to emptying fueling conduits associated with the fueling of aircraft. The invention is equally applicable to installations at loading docks, loading piers, etc., on the surface of the earth.

An object of this invention is to provide an apparatus for emptying liquid dispensing conduits when the dispensing operation has been completed. Another object of this invention is to provide an apparatus for emptying fueling conduits upon completion of the fueling of an aircraft which is provided with an under-wing fueling system. Another object of this invention is to provide apparatus for emptying the dispensing conduits of (1) inflammable or other hazardous liquids, (2) high-freezing point liquids, or (3) other problem liquids where such liquids are being dispensed. Still another object of this invention is to increase the flexibility of liquid dispensing facilities, where the amount of dispensing facilities available is limited, by providing a ready means for emptying the dispensing conduits after the termination of a dispensing operation. Other aspects, objects and advantages of the invention will be apparent to those skilled in the art in view of this disclosure.

Thus, according to the invention there is provided, in liquid dispensing apparatus, a combination comprising: a main flow conduit adapted to be connected at one end to a source of liquid supply and at the other end to a dispensing conduit; an eductor disposed in said main flow conduit; a vacuum tank; and an eduction conduit extending from the throat of said eductor to said tank to provide communication between said eductor and the interior of said tank.

FIGURE 1 is a diagrammatic illustration of a liquid dispensing system of the invention employed in loading of tank trucks.

FIGURE 2 is a diagrammatic illustration of a liquid dispensing system of the invention employed in the fueling of an aircraft provided with an under-wing fueling system.

FIGURE 3 is a diagrammatic illustration of a modified under-wing fueling system.

FIGURE 4 is a diagrammatic illustration showing details of a portion of the apparatus illustrated in FIGURE 2.

Referring now to the drawings, wherein like reference numerals have been employed to denote like elements, the invention will be more fully explained. In FIGURE 1, there is shown a main flow conduit 10 connected at one end by means of coupling 11 to a source of fuel supply represented by pump 12, and connected at the other end by means of elbow 13 to a dispensing conduit 14. A first valve 16 is disposed in said main flow conduit 10. An eductor 17 is operatively disposed in said conduit 10 with its inlet and outlet connected into said conduit 10 at couplings 18 and 19 respectively. An eduction conduit 21 is connected at one end to the throat of said eductor 17. The other end of said eduction conduit extends into an otherwise closed vacuum tank 22. If desired, said conduit 21 can extend to a point near the bottom of said tank or can merely provide communication between the throat of said eductor and the interior of said tank. A valve 23 is provided in said eduction conduit 21. Said tank is provided with a drain conduit 24 having a valve therein. One or more dispensing laterals 26, having valves 27 therein, extend from said dispensing conduit 14. Said dispensing laterals 26 are adapted to be coupled by means of couplings 28 to loading conduits 29 of transport trucks 31. Such transport trucks or other vehicles are normally provided with a vent valve 32 when they are provided with facilities for loading from the bottom as here illustrated. A vacuum relief valve 41 is disposed in, preferably at the end of, said dispensing conduit 14. Said valve 41 can be a conventional vacuum relief valve which is spring biased to a normal closed position but which opens when the pressure in conduit 14 becomes less than atmospheric and closes when atmospheric pressure (or higher) has been reestablished in conduit 14.

In FIGURE 2 there is shown a modification of the apparatus illustrated in FIGURE 1, and the use of said modification for fueling an aircraft and then emptying the fueling or dispensing conduits of said aircraft after the fueling operation has been completed. The downstream end of main flow conduit 10 is connected by means of coupling 34 to a dispensing conduit 36 (often referred to as a gallery line or gallery conduit in the aircraft industry) which extends along the wing 37 of the aircraft adjacent wing tanks A, B, and C. Dispensing laterals 38, having valves 39 therein, extend between said dispensing conduit 36 and said wing tanks A, B, and C. Said valves 39 can be any suitable type of valve. In some aircraft such valves are float actuated solenoid valves adapted to close when the tank becomes filled. A vacuum relief valve 41 is provided in said dispensing conduit 36. Vent valves 42 are provided in the upper part of each of said tanks A, B, and C. Any suitable normally closed pressure responsive valve can be employed as said valves 42.

The conduit 21 in FIGURE 2 extends into tank 22 to a point adjacent the bottom of said tank. Said tank and conduit have been provided with level control means which comprises a valve means within said tank for closing said eduction conduit 21 and thereby preventing further eduction of liquid from said tank when the liquid level therein has reached a predetermined minimum. One type of said level control means and valve means is illustrated in FIGURE 4.

Referring now to said FIGURE 4, there is shown a horizontally extending lever arm 43 pivotally supported at a point 44 intermediate its ends by means of support member 46 attached to the bottom of said tank. A valve member 47, having an O-ring 48 or other resilient seating material mounted thereon, is mounted on one end of said lever arm below the end of said eduction conduit 21. A float 49, having a greater weight than said valve member, is attached to the other end of said lever arm 43 by means of a vertically extending adjustable connecting link 51. Said link member 51 is rigid but is adjustable in length by means of turnbuckle 52 or other suitable means disposed therein. As shown in FIGURE 4, the lower end of eduction conduit 21 has been closed by valve member 47 and O-ring 48. This closure has been brought about by reduction of the liquid level in tank 22 which reduced the buoyant effect of the liquid upon float 49, causing the heavier float assembly to exert its weight on lever arm 43 and pivot said lever arm at 44 to swing valve member 47 upwardly into contact with the end of conduit 21. As will be recognized by those skilled in the art, the lower portion of conduit 21 thus also serves as a valve body with the lower end of said conduit being a valve seat. The actual minimum level of liquid maintained in tank 22 can be controlled by adjusting the length of link member 51 by means of turnbuckle 52.

In FIGURE 3 there is illustrated a modification of a wing tank of an aircraft wherein the dispensing lateral 38' extends through the bottom of the wing tank and into said wing tank to a point adjacent the top thereof. When fuel is pumped through dispensing conduit 36 and lateral dispensing conduit 38', it overflows at the top of said dispensing lateral. In such tanks and such fueling systems the wing tanks can be "topped off" by means of a top fill opening 53 if desired. Said top fill opening can be opened during the filling through conduit 36 to provide a vent.

In the operation of the apparatus illustrated in FIGURE 1, fuel is pumped through main flow conduit 10 having eductor 17 disposed therein and into dispensing conduit 14. Said fuel then passes through one or more dispensing laterals 26 to one or more trucks 31 having the tanks 35 mounted thereon. During such fueling operation the vent valve 32 on the tank 35 is open to permit filling of the tank from the bottom. During such a fueling operation the valve 23 is open and fuel passing through eductor 17 pulls a vacuum on said tank 22. As shown in FIGURE 1, no level of liquid is maintained in tank 22. Near the close of the fueling operation, and before flow through conduit 10 has been reduced in volume, valve 23 is closed so as to maintain the vacuum which has been generated in tank 22. At the end of the fueling operation, pump 12 is shut down, valve 16 is closed, and valve 30 in the truck filling conduit 29 is closed. Valve 23 in eduction conduit 21 is then opened. Upon the opening of valve 23 the vacuum generated in partially evacuated tank 22 will pull the fuel from conduit 10, dispensing conduit 14, and the lateral dispensing conduits 26 back into tank 22. Valve 16 can be positioned as shown, or closer to eductor 17, to empty as much of the upstream portion of conduit 10 as desired. Vacuum relief valve 41 in dispensing conduit 14 is provided to open when the pressure in said conduits 10 and 14 becomes less than atmospheric and will admit air into said conduits thus insuring that they are completely empty of liquid fuel. The fuel which is thus pulled back into tank 22 can be either drained or pumped out via drain conduit 24, or it can be educted into fuel passing through conduit 10 in the next fueling operation.

In the modification of the apparatus illustrated in FIGURE 2 vacuum tank 22 will usually contain fuel up to the level 25 from the previous fueling operation and the valve at the foot of conduit 21 will be open. The fuel stream passing through conduit 10 and eductor 17 will draw fuel from tank 22 via conduit 21 until a predetermined minimum level is reached at which time valve member 47 will be pivoted into contact with the lower end of conduit 21 and said conduit closed as illustrated more clearly in FIGURE 4. Said fuel being passed through conduit 10 enters dispensing conduit 36 and from there is dispensed via lateral conduits 38 into wing tanks A, B, and C. During such fueling operation the vent valves 42 are, of course, open to permit the complete filling of said tanks. Near the close of said fueling operation, or after the liquid in tank 22 has reached the predetermined minimum, valve 23 is closed so as to maintain the vacuum which has been generated in said tank 22. At the end of the fueling operations pump 12 is shut down, valve 16 is closed, and valves 39 are also closed. Valve 23 in eduction conduit 21 is then opened and the vacuum in tank 22 draws liquid from said main flow conduit 10 and dispensing conduit 36 back into tank 22. Vacuum relief valve 41 at the end of said dispensing conduit 46 opens when the pressure in said conduit 10 and dispensing conduit 36 falls below atmospheric pressure thus admitting air to said conduit and insuring the complete removal of fuel from said conduits 36 and 10.

The modification of the apparatus illustrated in FIGURE 2 is the presently preferred form because maintaining a predetermined minimum level of fuel in said tank 22 provides for the delivery of more accurate fuel volumes to the aircraft being fueled and two-phase fluid flow in the conduits downstream from eductor 17 is avoided.

In fueling aircraft having wing tanks of the type illustrating in FIGURE 3, the operation would be like that described above in connection with FIGURE 2 except that valve 40 would not be closed at the end of the fueling operation through conduit 36 until after valve 23 in eduction conduit 21 had been reopened, and the fuel in said conduit 36 has been pulled back into tank 22. Since lateral dispensing conduit 38' is open at the top, and top fill opening 53 is open to provide a vent to the atmosphere, air will be admitted to conduits 38' and 36 during the time fuel is being pulled back into tank 22 and atmospheric pressure will be established or maintained in said conduits 38' and 36 to insure complete removal of fuel therefrom. Valve 40 is then closed after said conduits have been emptied of the liquid fuel.

It is believed that the advantages of the invention over the apparatus of the prior art are obvious in view of the above-detailed description. The apparatus of the invention is particularly advantageous in the fueling of aircraft wherein the gallery or dispensing conduits are disposed adjacent to electrical conduits and heating ducts because it is extremely important that all hazardous conditions be eliminated in aircraft. However, the elimination of hazardous conditions at ground installations is almost as important. The conveniences and economies effected in not having to steam trace or otherwise heat the dispensing conduits where high melting point liquids are being dispensed will be readily apparent to those skilled in the art. Likewise, the economies resulting from the increase in flexibility of a limited dispensing system by providing means whereby said dispensing system can be conveniently emptied when it is desired to make a change in the product being dispensed, will also be apparent to those skilled in the art.

It is to be understood that the invention is not to be limited by the specific embodiments illustrated above. Various other modifications will be apparent to those skilled in the art in view of the above disclosure. Such modifications are within the scope and spirit of the invention.

I claim:

1. In liquid dispensing apparatus, the combination comprising: a main flow conduit adapted to be connected at one end to a source of liquid supply and at the other end to a dispensing conduit; a first valve disposed in said main flow conduit; an eductor disposed in said main flow conduit downstream from said first valve; a vacuum tank; an eduction conduit connected at one end to the throat of said eductor, the other end of said eduction conduit extending into said vacuum tank; a second valve disposed in said eduction conduit between said eductor and said tank; and a normally closed vacuum relief valve connected to said dispensing conduit adjacent the downstream end thereof and operable to open only when the pressure in said dispensing conduit is less than atmospheric.

2. In liquid dispensing apparatus, the combination comprising: a main flow conduit adapted to be connected at one end to a source of liquid supply and at the other end to a dispensing conduit; a first valve disposed in said main flow conduit; an eductor disposed in said main flow conduit downstream from said first valve; a vacuum tank; an eduction conduit connected at one end to the throat of said eductor, the other end of said eduction conduit extending into said tank to a point near the bottom thereof; a second valve disposed in said eduction conduit between said eductor and said tank; a level control valve means within said tank for closing said eduction conduit to thereby present further eduction of liquid from said tank when the liquid level therein has reached a predetermined minimum; and a vacuum relief valve connected to said dispensing conduit adjacent the downstream end thereof and adapted to open only when the pressure in said dispensing conduit is less than atmospheric.

3. The apparatus of claim 2 wherein said level control valve means is a float responsive valve comprising: a lever arm pivotally supported at a point intermediate its ends; a valve member mounted on one end of said lever arm below the end of said eduction conduit and adapted to seat at the end of and close said eduction conduit; and a float member, having a greater weight than said valve member, mounted on the other end of said lever arm.

4. In apparatus for under-wing fueling of aircraft wherein fuel is delivered from a source of fuel supply through a main flow conduit and into a dispensing conduit for distribution into the fuel tanks of said aircraft, the improvement which comprises: a first valve disposed in said main flow conduit; an eductor disposed in said main flow conduit downstream from said first valve; a vacuum tank; an eduction conduit connected at one end to the throat of said eductor, the other end of said eduction conduit extending into said tank to a point near the bottom thereof; a second valve disposed in said eduction conduit between said eductor and said tank; a level control valve means within said tank for closing said eduction conduit and thereby preventing further eduction of liquid from said tank when the liquid level therein has reached a predetermined minimum; and a vacuum relief valve connected to said dispensing conduit adjacent the downstream end thereof and adapted to open only when the pressure in said dispensing conduit becomes less than atmospheric.

5. In liquid dispensing apparatus, the combination comprising: a main flow conduit adapted to be connected at one end to a source of liquid supply and at the other end to a dispensing conduit; a first valve disposed in said main flow conduit; an eductor disposed in said main flow conduit downstream from said first valve; a vacuum tank; an eduction conduit connected at one end to the throat of said eductor, the other end of said eduction conduit extending into said vacuum tank; a second valve disposed in said eduction conduit between said eductor and said tank; at least one dispensing lateral connected to said dispensing conduit; a dispensing valve in said dispensing lateral; and a normally closed vacuum relief valve connected to said dispensing conduit adjacent the downstream end thereof and downstream from said dispensing lateral and operable to open only when the pressure in said dispensing conduit is less than atmospheric.

6. In liquid dispensing apparatus, the combination comprising: a main flow conduit adapted to be connected at one end to a source of liquid supply and at the other end to a dispensing conduit; a first valve disposed in said main flow conduit; an eductor disposed in said main flow conduit downstream from said first valve; a vacuum tank; an eduction conduit connected at one end to the throat of said eductor, the other end of said eduction conduit extending into said tank to a point near the bottom thereof; a second valve disposed in said eduction conduit between said eductor and said tank; a level control valve means within said tank for closing said eduction conduit to thereby prevent further eduction of liquid from said tank when the liquid level therein has reached a predetermined minimum; at least one dispensing lateral connected to said dispensing conduit; a dispensing valve in said dispensing lateral; and a vacuum relief valve connected to said dispensing conduit adjacent the downstream end thereof and downstream from said dispensing lateral and adapted to open only when the pressure in said dispensing conduit is less than atmospheric.

7. In apparatus for under-wing fueling of aircraft wherein fuel is delivered from a source of fuel supply through a main flow conduit and into a dispensing conduit for distribution into the fuel tanks of said aircraft, the improvement which comprises: a first valve disposed in said main flow conduit; an eductor disposed in said main flow conduit downstream from said first valve; a vacuum tank; an eduction conduit connected at one end to the throat of said eductor, the other end of said eduction conduit extending into said tank to a point near the bottom thereof; a second valve disposed in said eduction conduit between said eductor and said tank; a level control valve means within said tank for closing said eduction conduit and thereby preventing further eduction of liquid from said tank when the liquid level therein has reached a predetermined minimum; at least one dispensing lateral connected to said dispensing conduit; a dispensing valve in said dispensing lateral; and a vacuum relief valve connected to said dispensing conduit adjacent the downstream end thereof and downstream from said dispensing lateral and adapted to open only when the pressure in said dispensing conduit is less than atmospheric.

8. In liquid dispensing apparatus, the combination comprising: a main flow conduit adapted to be connected at one end to a source of liquid supply and at the other end to a dispensing conduit; a first valve disposed in said main flow conduit; an eductor disposed in said main flow conduit downstream from said first valve; a vacuum tank; an eduction conduit connected at one end to the throat of said eductor, the other end of said eduction conduit extending into said vacuum tank; a second valve disposed in said eduction conduit between said eductor and said tank; and a vacuum relief valve connected to said dispensing conduit adjacent the downstream end thereof, said vacuum relief valve being closed when the pressure in said dispensing conduit is at least atmospheric and open when the pressure in said dispensing conduit is less than atmospheric.

References Cited in the file of this patent

UNITED STATES PATENTS

| | | |
|---|---|---|
| 1,379,529 | Combellick | May 24, 1921 |
| 2,747,783 | Wooldridge | May 29, 1956 |
| 2,864,410 | Sauer | Dec. 16, 1958 |

FOREIGN PATENTS

| | | |
|---|---|---|
| 195,460 | Austria | Feb. 10, 1958 |